United States Patent

[11] 3,626,827

[72] Inventors Akio Yanagi;
Shoichiro Kakuta; Takeo Iida, all of Tokyo, Japan
[21] Appl. No. 770,634
[22] Filed Oct. 25, 1968
[45] Patented Dec. 14, 1971
[73] Assignee Minolta Camera Kabushiki Kaisha
Osaka, Japan
[32] Priorities Oct. 26, 1967
[33] Japan
[31] 42/68557;
Nov. 22, 1967, Japan, No. 42/74680

[54] AUTOMATIC EXPOSURE ADJUSTMENT DEVICE FOR FLASH PHOTOGRAPHY
2 Claims, 14 Drawing Figs.

[52] U.S. Cl. .................................................. 95/10 C, 95/53 E
[51] Int. Cl. .................................................. G03b 9/62, G03b 7/08
[50] Field of Search .......................................... 95/10 C, 11, 11.5, 53

[56] References Cited
UNITED STATES PATENTS
| | | | |
|---|---|---|---|
| 3,257,919 | 6/1966 | Sato et al. .................... | 95/10 C |
| 3,426,661 | 2/1969 | Wick et al. .................... | 95/10 C |
| 3,438,313 | 4/1969 | Topaz .......................... | 95/10 C |
| 3,438,766 | 4/1969 | Biber .......................... | 95/11 |
| 3,440,938 | 4/1969 | Stimson et al. ................ | 95/10 C |
| 3,465,656 | 9/1969 | Wick et al. .................... | 95/10 C |

Primary Examiner—Joseph F. Peters
Attorney—Watson, Cole, Grindle & Watson

ABSTRACT: An automatic exposure adjustment device for flash photography wherein part of the light rays of the flashbulb enter the photoelectric element and thus the flashlight intensity can be measured by the photoelectric element. The exposure adjustment factors, except the exposure time, are made to correspond with the light intensity control part, such as a filter or a stop, which controls the light intensity of the beam on the photoelectric element and also with the variable resistance which adjusts the switching starting voltage of the transistor which is operated by the electric delay circuit. The photoelectric element is the time constant factor and optimal conditions for the subject's distance, the camera lens stop, the film sensitivity and the flash for flash photography may be automatically established and the exposure time determined.

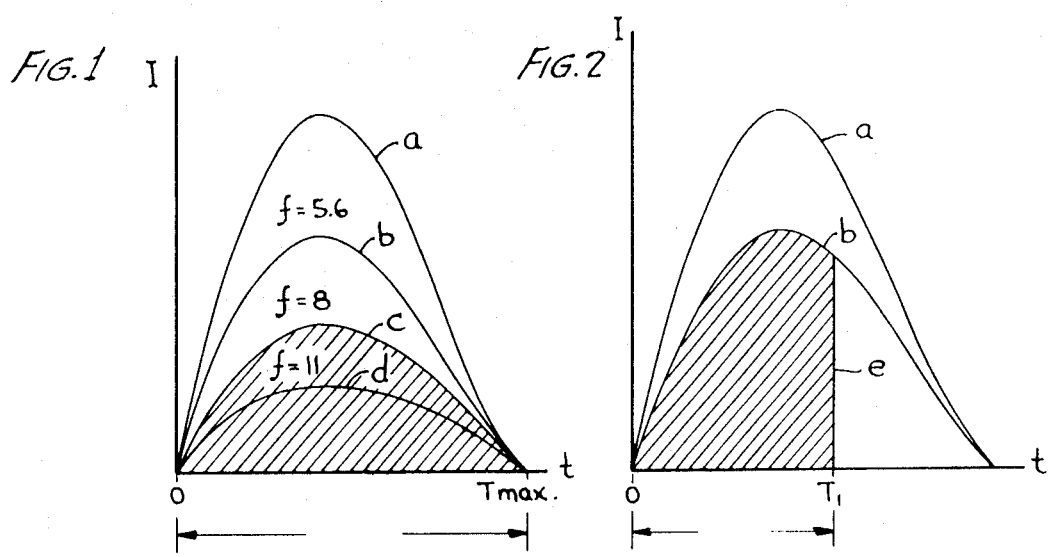
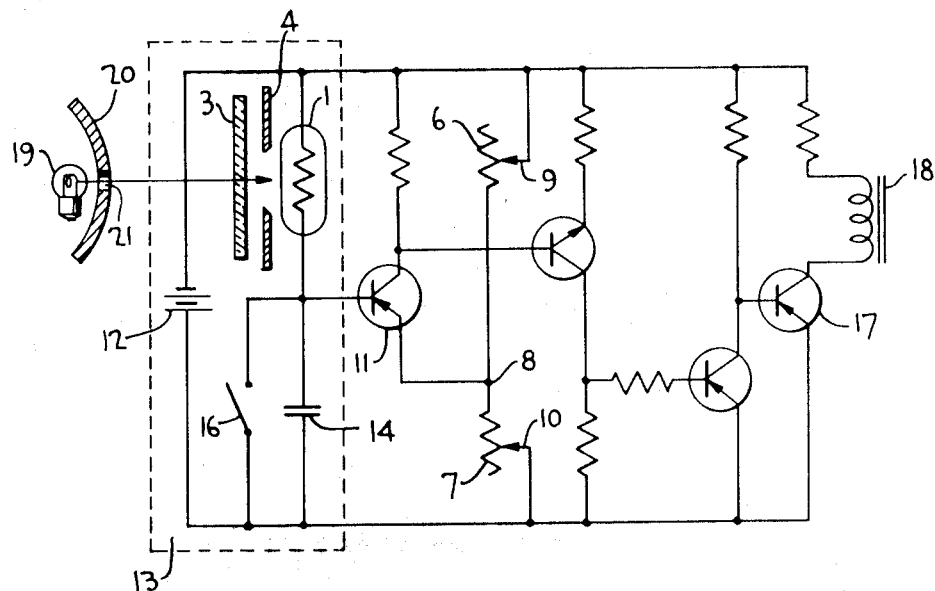
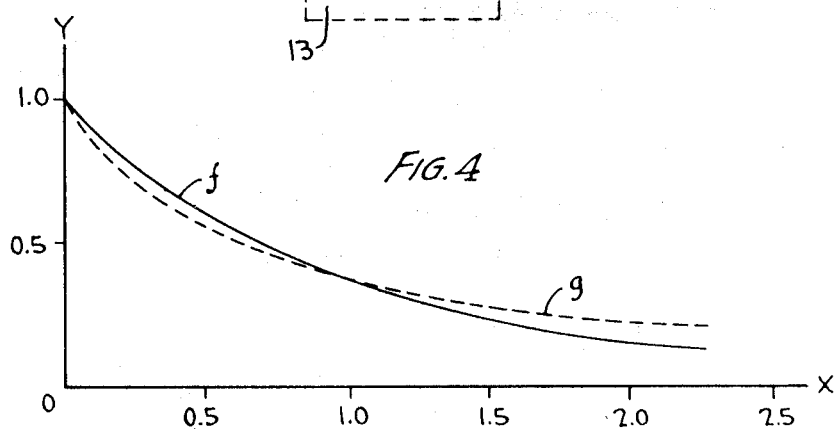
INVENTORS,
AKIO YANAGI
SHOICHIRO KAKUTA
TAKEO IIDI Patented Dec. 14, 1971  3,626,827

INVENTORS,
AKIO YANAGI
SHOICHIRI KAKUTA
TAKEO IIDI
BY Watson, Cole, Grindle & Watson
ATTORNEYS

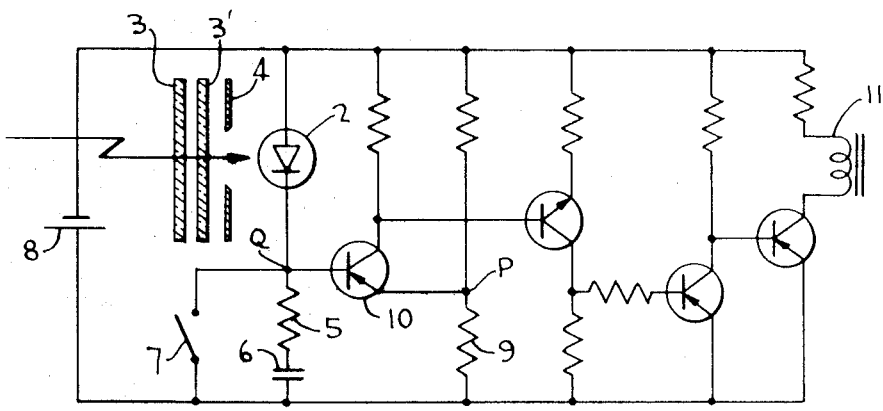
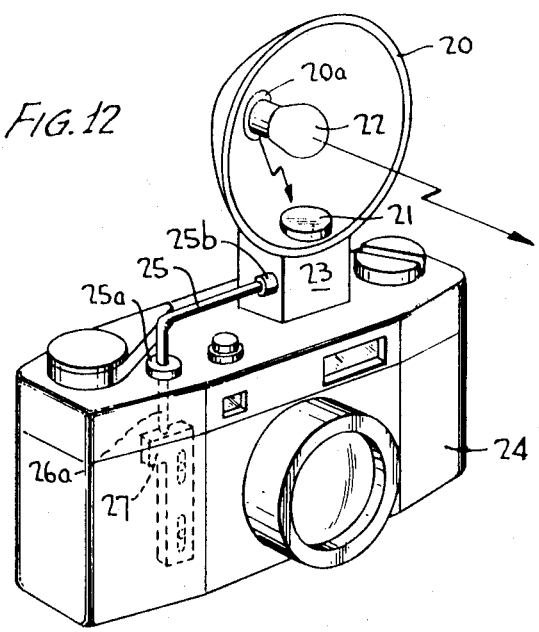
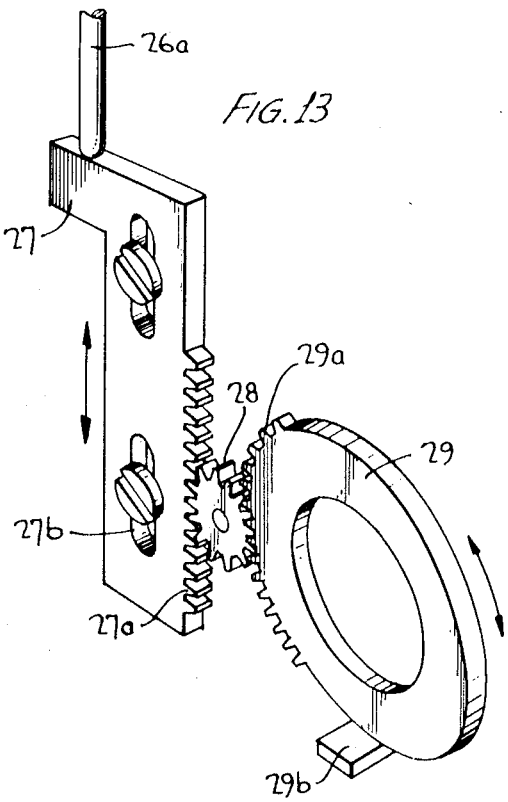
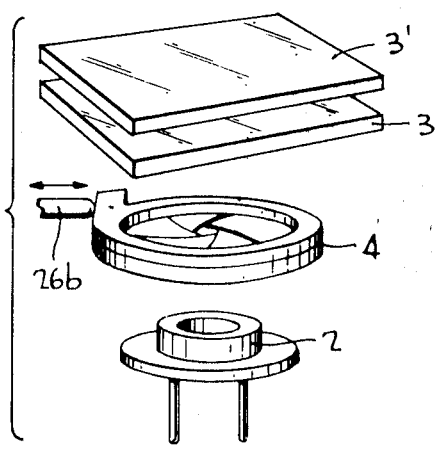

AUTOMATIC EXPOSURE ADJUSTMENT DEVICE FOR FLASH PHOTOGRAPHY

BACKGROUND OF THE INVENTION

In the exposure adjustment of the conventional flash, the exposure time is made equal to the flash duration and the quotient obtained by dividing the guide number of the flashbulb by the subject's distance determines the stop. Therefore, with this conventional exposure adjustment, division must be made each time and even among the bulbs with the same guide number their flash intensities are often not the same, causing an error in the exposure. And also this conventional adjustment has the defect that the stop cannot be set first in accordance with the photographic object.

There has also been used an exposure adjustment device in which an electric delay circuit using the photoelectric element in which the delay is determined in accordance with the brightness of the subject. The flashbulb is ignited at the same moment as the shutter is opened and the reflected light from the illuminated subject is received by the photoelectric element. The condenser of the CR circuit, of which the impedance of the said photoelectric element is the time constant factor, is charged and the shutter is closed when the magnet is affected by the transistor switching circuit which opens when the said condenser is charged to a certain voltage. This type of exposure adjustment has the advantage that the guide number does not have to be used. But with flash photography, there always exists within the range of the flash the background or foreground surrounding the main subject which is the object. This background or foreground lies at indefinite distances from the camera, and the reflected light from the illuminated background or foreground at indefinite distances also comes onto the photoelectric element at the same time as the reflected light from the main subject. Thus, when, for example, the main subject is small in comparison with the background, there is an excessive exposure for the main subject, and when there is a relatively small foreground there is a lack of exposure for the main subject.

SUMMARY OF THE INVENTION

With the present invention, in order to eliminate the aforesaid defects, part of the flash is focused onto the photoelectric element and at least one of the exposure adjustment factors, the camera lens stop, the film sensitivity and the subject's distance, is made to correspond with the variable light intensity adjustment part, such as a filter or a stop which is set in the path of the incident beam. When necessary, the rest of the exposure adjustment factors are made to correspond with the switch starting voltage adjustment part of the transistor switching circuit which is activated by the delay circuit including the photoelectric element, so that the conditions of the equation $$A^2 \textcircled{H}^2 = \phi^2 \theta^2 S \int_0^t F(t)dt$$

may be automatically satisfied. The photoelectric element may be either cadmium sulfide or a solar battery.

BRIEF DESCRIPTION OF THE DRAWINGS

FIG. 1 is the graph of the exposure adjustment of the conventional flash photography in which the stop is determined by the guide number and the subject's distance from the camera;

FIG. 2 is the graph of the exposure adjustment using an electric control shutter;

FIG. 3 is the circuit diagram of the first preferred embodiment of the present invention;

FIG. 4 is the graph in which the curves of $y=e^{-x}$ and $y=1/(1+\alpha\alpha x)$ are compared;

FIG. 11 is the circuit diagram of the third preferred embodiment;

FIG. 12 is the exterior perspective view of the said preferred embodiments;

FIGS. 13 and 14 are the perspective views of the preferred embodiment of the device (FIG. 13) which connects the distance adjustment ring with the stop for the photoelectric element incident rays (FIG. 14).

DESCRIPTION OF THE PREFERRED EMBODIMENT

Figure 5:
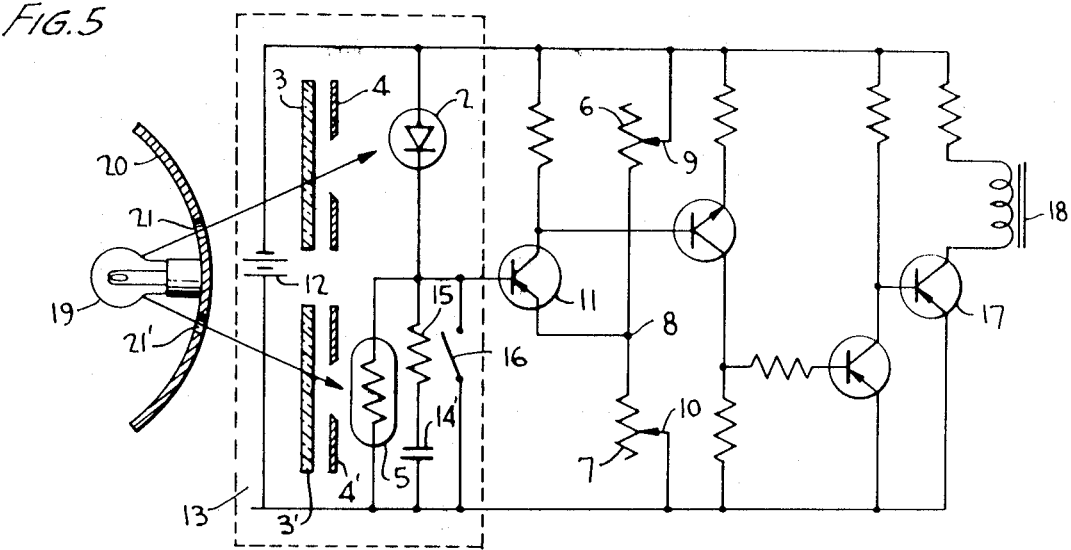
FIG. 5 is the circuit diagram of the second preferred embodiment of the present invention.

When the exposure is determined according to the conventional flashbulb guide number and the subject's distance from the camera, the shutter is kept open during the flash duration from $t=0$ to $t=t_{max}$ as is shown in FIG. 1 and the stop is determined (e.g. $f=8$) as the quotient of the said two values. The film is exposed to the light rays as is shown by the oblique lines.

Whereas, with the electric control shutter, the stop is set to a given number and that much of flash light intensity as corresponds to the stop (e.g. curve $b$) is let in and integrated and when the required value of light is obtained ($t=t_1$) the shutter is closed.

Before the description of the preferred embodiment of the present invention, the general relation of the stop, the subject's distance from the camera (or the rotation angle of the distance adjustment ring), the guide number and the film sensitivity, required to obtain the proper exposure for flash photography are represented as follows:

$$A \times l = N \quad (1)$$

of which $A$ is the stop, $N$ is the guide number and $l$ is the subject's distance.

With the conventional camera in which the lens is let out by a helicoid for focus adjustment, if the distance adjustment ring is to be rotated $\theta°$ for adjusting from infinity to $l$:

$$\theta \times l = \textcircled{H} \quad (2)$$

$\textcircled{H}$ is the constant which is determined by the focal distance of the lead lens of the helicoid, and with the helicoid, for example, of which the focal distance is 50 mm. and the rotation angle of the distance adjustment ring is 90° for adjusting from infinity to 1 m., $$\textcircled{H} \doteqdot 90° \text{ m.}$$

From the equations (1) and (2) is obtained $$A \cdot \textcircled{H} = \theta \cdot N \quad (3)$$

And also $$N = \phi \sqrt{S \cdot P} \quad (4)$$

is known, of which $S$ is the film sensitivity, $P$ is the total light value of the flashbulb with the lumen and second as the units of measurement and $\Phi$ is a constant.

With the present invention, however, the total flashlight value of the flashbulb is not used for photographing but the shutter is closed, just like the case shown in FIG. 2, before the flashbulb burns out, so that the guide number $N$ of of the flashbulb is to be understood to change with time. Therefore, $$N(t) = \phi \sqrt{S \int_0^t F(t)dt} \quad (5)$$

of which $F(t)$ is the beam of the flashbulb at a given time and $$\int_0^{t\,max} F(t)dt = P.$$

From the equations (5) and (3) is obtained $$A \cdot \widehat{H} = \phi \cdot \theta \sqrt{S \int_0^{t'} F(t)dt} \qquad (6)$$

And by squaring, $$A^2 \cdot \widehat{H}^2 = \phi^2 \cdot \theta^2 S \int_0^{t'} F(t)dt \qquad (7)$$

of which $t_1$ is the time when the shutter is closed.

The equations (6) and (7) are the fundamental equations governing the present invention. The purpose of the present invention is to obtain a device which realizes these equations. $F$ is the symbol for the beam and can be replaced with the light intensity symbol $I$ by replacing $\Phi$ with some other constant.

In the preferred embodiment of the present invention shown in FIG. 3, the photoconductive element 1, which responds to light very quickly and can be regarded as approximating to the ideal photoelectric element whose $\gamma$ value is 1, is so placed as to be able to receive part of the light from the flashbulb 19 and therefore receives the light intensity which is proportionate to the said beam $F$. 3 shows the filter which prevents the photoconductive element 1 from being directly exposed to the strong flashbulb light and the filter can be replaced by some other light intensity adjustment device. 4 shows an incident light intensity adjustment device such as a stop with an aperture in proportion to the film sensitivity $S$ and it can be replaced by some other light intensity adjustment device such as a filter or a gradual filter.

The CR charging circuit consists of the photoconductive element 1, the condenser 14 and source 12 in series with the photoconductive element 1. In parallel with the condenser 14 is switch 16 which initiates the charging of the condenser 14 when it is open. The connection point of the photoconductive element 1 and the condenser 14 is connected with the base of the transistor 11 of the switching circuit, and the emitter potential 8 of the transistor 11 is connected with the source 12 through the variable resistances 7, 10 and 6, 9. In the collector circuit of the transistor 11 is connected to transistor 17 through a pair of amplification transistors, and the collector circuit of the transistor 17 is connected with the source through the electromagnet 18. The resistance value of the variable resistance 6, 9 changes in accordance with the movement of the distance adjustment ring not shown in the Figure, and the said change in the resistance value is arranged to be in proportion to the square of the rotation angle $\theta$ of the distance adjustment ring. The resistance value of the variable resistance 7, 10, which can be replaced by a switch resistance, is changed by the camera lens stop adjustment ring (not shown in the Figure) in such a way that the resistance value is in proportion to the square of the camera lens stop $A$. For example, $4k\Omega$ corresponds to an $f4$ stop, which becomes $8k\Omega$ when the stop is adjusted to be $f5.6$. The electromagnet 18 closes the shutter when the transistor 11 is on and the collector current flows when transistor 17 is off and the electromagnet 18 is inoperative.

Because of the construction as described above of the preferred embodiment shown in FIG. 3, the resistance value R of the photoconductive element 1 when it receives the light proportionate to $F(t)$ is:

$$R = (R_o)/(K \cdot S \cdot F(t)) \qquad (8)$$

of which $F(t)$ is the beam value at a certain time $t$ during the duration of the flash. By adjusting the dimension of $K$, $K \cdot S \cdot F(t)$ can be made an abstract number, and $R_o$ is a constant with the ohm as the unit.

Then the following differential equation is established as to the charging circuit 13 surrounded by the broken line in FIG. 3:

$$\frac{R_0}{K \cdot S \cdot F(t)} \frac{dq}{dt} + \frac{q}{c} = E_0 \qquad (9)$$

of which $q$ is the electric charge of condenser 14.

To solve this differential equation and introduce the condition that $q=0$ when $t=0$, the voltage $V$ of the condenser 14 is:

$$V = E_0 \left\{ 1 - \exp\left(-\frac{KS}{CR_0} \int F(t)dt\right) \right\} \qquad (10)$$

For the sake of simplicity the switch 16 is regarded to be opened at the exact moment when the shutter opens, but in practice because there is practically no charging till the flash is ignited the opening of the switch 16 does not have to coincide with the opening of the shutter so long as the flash is to be ignited after the opening of the shutter, and it is enough if the switch is opened between the shutter opening and the flash ignition.

As is evident from the graph shown in FIG. 4, the functions $y=e^{-x}$ and $y=(1/1+\alpha x)$ generally show closely approximate curves. The curve $f$ of FIG. 4 shows the curve of $y=e^{-x}$ and the curve $g$ shows the curve of $y=(1/1+\alpha x)$ when $\alpha=1.7$. Therefore, the equation (10) is approximately:

$$V \doteqdot E_0 \left( 1 - \frac{1}{1 + \frac{\alpha KS \int F(t)dt}{CR_0}} \right)$$

$$= E_0 \frac{\alpha KS \int F(t)dt}{CR_0 + \alpha KS \int F(t)dt}$$

$$= E_0 \frac{KS \int F(t)dt}{\frac{CR_0}{\alpha K} + S \int F(t)dt}$$

$$V = E_0 \frac{S \int F(t)dt}{\widehat{H}^2 + S \int F(t)dt} \qquad (11)$$

Here CK is determined so that $CR_o/K = \widehat{H}$.

With the preferred embodiment shown in FIG. 3, when this charging voltage $V$ becomes equal to the potential $V_p$ of the transistor emitter potential 8, the transistor 11 is turned on and the transistor 17 turned off, and the current is cut off from the electromagnet 18.

In practice there is the difference of about $V - V_p = 0.1^V$ between the charging voltage $V$ and the emitter voltage $V_p$, but then the exposure error compensated by adjusting the value $\alpha$ to be a little smaller than the theoretical value. Supposing, for the sake of simplicity, there is no such difference, from the equation (11)

$$V = E_0 \frac{S \int F(t)dt}{\widehat{H}^2 + S \int F(t)dt}$$

and $$V_p = E_0 \frac{kA^2}{k\varphi^2 \theta^2 + kA^2}$$

and because $V = V_p$, $$\frac{S \int F(t)dt}{\widehat{H}^2 + S \int F(t)dt} = \frac{A^2}{A^2 + \varphi^2 \theta^2} \qquad (12)$$

And by rearranging the equation (12) the equation (7) can be obtained.

From the foregoing description the preferred embodiment shown in FIG. 3 provides the operation set forth in equation (7) and therefore the preferred embodiment can automatically adjust the proper exposure for photography.

Figure 6:
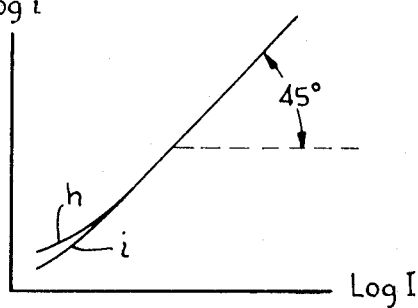
FIG. 6 is the graph showing the photoelectric property of the solar battery.
Figure 7:
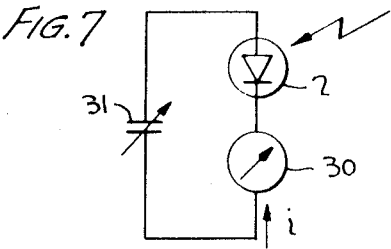
FIG. 7 is the circuit which measures the property shown in FIG. 6.

As has been stated, with the preferred embodiment shown in FIG. 3, the photoconductive element used as the photoelectric element is supposed to be an ideal one, but with the preferred embodiment shown in FIG. 5, whose circuit is equivalent to the preferred embodiment shown in FIG. 3, an existing photoelectric element is used. The solar battery 2 is used as the photoelectric element in FIG. 5. Some of the solar battery has the spectrosensitivity property curve whose peak coincides with that of the naked eye, it follows (responds to) the change in light very quickly, its output current is proportional to illumination, and it has the characteristic $\gamma=1$. In order to ascertain the photoelectric property of the solar battery against various illuminations as it is used in the manner of the present embodiment, its photoelectric property is measured, changing the voltage of the source 31 of the series circuit consisting of the solar battery 2, the ammeter 30 and the variable voltage source 31 (FIG. 7). The result is shown in FIG. 6. According to this, the illumination photoelectric property of the solar battery is generally constant regardless of the source voltage with the exception of the portions $h$ and $i$ only in the low illumination regions under 50 luxes and then the proportional relation is lost between the logarithmic values of the output current and the illumination. However, this dark current is of small value and also is limited to the low illumination range, and so with the present invention in which part of the flash is directly measured, adjustment is possible to eliminate the influence of the low illumination range by adjusting the filter 3 and choosing the light measurement scope outside of the low illumination range. If the solar battery with such a property as is described above is directly used by itself to replace the ideal photoconductive element 1 of the preferred embodiment shown in FIG. 3, the charging voltage of the condenser 14 will be proportional to the beam and have a straight line characteristic, not coinciding with the $y=e^{-x}$ or the approximate $y=1/(1+\alpha x)$ shown in FIG. 4. Therefore, in the present preferred embodiment, to obtain the agreement with the said curves, the photoconductive element 5 is connected in parallel with condenser 14' and the fixed resistance 15, and both the solar battery 2 and the photoconductive element 5 receive part of the light rays from the flashbulb 19 coming through the light intensity adjustment devices 4, 4' which let in light which is proportional to the film sensitivity S. The light intensity adjustment devices 3', 4' may either be used in common with 3, 4 or arranged separately. And the connection point of the series circuit of the condenser 14' and the fixed resistance 15, the parallel circuit including the photoconductive element 5, and of the solar battery 2, is connected with the base of the transistor 11 of the switching circuit, and the amplification circuit and the electromagnet circuit are of the same construction as the ones shown in FIG. 3.

Figure 8:
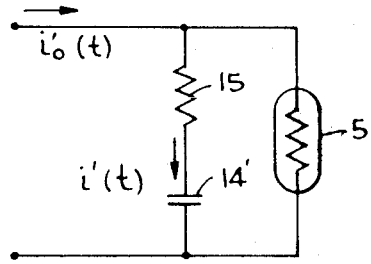
FIG. 8 shows the circuit equivalent to the one of the second preferred embodiment shown in FIG. 5.

In the present preferred embodiment shown in FIG. 5 with the construction as described above, the solar battery 2, whose illumination property curve is not affected by the voltage, and the source 12 can be regarded as constituting the input, and then the charging circuit surrounded by the broken line 13 becomes equivalent to the circuit shown in FIG. 8. The fixed resistance 15 in the circuit adjusts the delay in the shutter closing caused by the inertia of the mechanical shutter part. That is to say, even when the current is cut off from the electromagnet by the electric signal there is a delay of a few milliseconds before the shutter is actually closed, and the resistance 15 adjusts this delay. Therefore, when the resistance value of the fixed resistance 15 is properly chosen to adjust the shutter closing delay, the circuit of FIG. 8 becomes equivalent to the one of FIG. 9. The photoconductive element 5 is not an ideal one as in FIG. 3 but one having a practical light response property, in other words, the tendency to follow the change of the incident rays, as is shown in FIG. 10. Namely, the photoconductive element 5, of which the value of $\gamma$ approximates 1, does not follow (respond) well just as the flashbulb begins to flash but follows comparatively well after a certain period of time, and in FIG. 10, of which abscissa represents the time and the ordinate represents the light intensity of the flashbulb, the flashbulb has a characteristic represented by the curve $a$, while the photoconductive element 5 follows (responds) like the curve $j$, and it is seen that there is a delay of $td$ (3 to 4 milliseconds) at the beginning of the rise of the curves $a$ and $i$.

Figure 9:
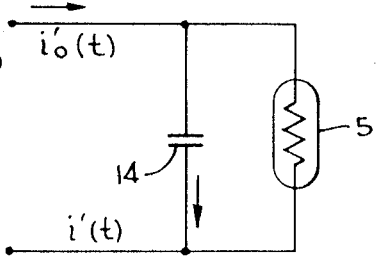
FIG. 9 shows the circuit (which adjusts the shutter closing delay) equivalent to the one shown in FIG. 8.
Figure 10:
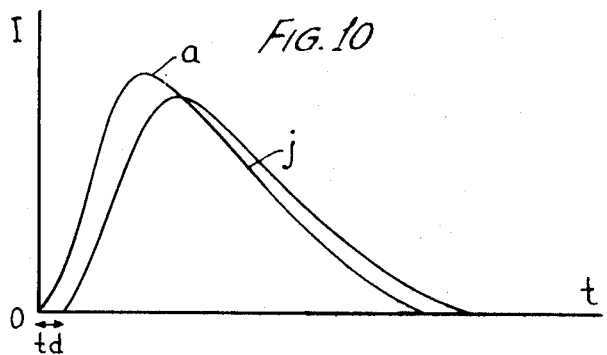
FIG. 10 is the graph to explain the response, to the change in light intensity, of cadmium sulfide used as the photoelectric element.

To consider the working of the circuit of FIG. 5 according to the equivalent circuit of FIG. 9, the solar battery 2 of FIG. 5 produces the current $i_0'(t)$ which is proportional to the light intensity of the flashbulb 19:

$$i_0'(t) = K' \cdot S \cdot F(t) \quad (13)$$

of which the unit of measurement for $K'$ is properly chosen so that the unit of measurement of $i_0'(t)$ is in amperes.

Then the current $i'(t)$ that flows in FIG. 9 is:

$$i'(t) = i_0'(t) - (V'(t)/(R'(t))) \quad (14)$$

Here $V'(t)$ is the charging voltage of the condenser 14' shown in FIG. 9, $R'(t)$ the resistance value of the photoconductive element 5. Thus $R'(t)$ may approximately be:

$$R'(t) \doteq (R_\infty')/(K'' \cdot S \cdot F(t)) \quad (15)$$

Here $K''$ is the constant whose value is determined by the adjustment of the light intensity adjustment devices 3', 4' and its unit of measurement is formulated so that $K'' \cdot S \cdot F(t)$ may become an abstract number.

And the current $i(t)$ that flows into the condenser of the charging circuit having an ideal photoconductive element as the one in the preferred embodiment of FIG. 3, is:

$$i(t) = \frac{E_0}{R(t)} - \frac{V(t)}{R(t)} \quad (16)$$

of which $R(t)$ is shown by the equation (8) and $V(t)$ by (10).

The first term of the equation (16) is the photoelectric current when there is no condenser it corresponds to the first term of the equation (14). From the equation (14) is obtained:

$$R'(t) \cdot i(t) + V'(t) = i_0'(t) \times R'(t) \quad (17)$$

And because in the equation (17)

$$i'(t) = dq'/dt$$

$$V'(t) = q'/C$$

from the equation (17)

$$R'(t) \cdot \frac{dq'}{dt} + \frac{q'}{C} = i_0'(t) \times R'(t) \quad (18)$$

To introduce $i_0'(t) = K' \cdot S \cdot F(t)$ of the equation (13) and $R'(t) = (R_\infty')/(K'' \cdot S \cdot F(t))$ of the equation (15) into the equation (18):

$$\frac{R_0'}{K'' \cdot S \cdot F(t)} \cdot \frac{dq'}{dt} + \frac{q'}{C} = K' \cdot S \cdot F(t) \times \frac{R_0'}{K'' \cdot S \cdot F(t)}$$

$$\frac{R_0'}{K'' \cdot S \cdot F(t)} \cdot \frac{dq'}{dt} + \frac{q'}{C} = \frac{K'}{K''} \cdot R_0' \quad (19)$$

And just as the equation (10) was the differential equation (9), from the equation (19) is obtained:

$$V'(t) = \frac{K'}{K''} \cdot R_0' \left\{ 1 - \exp\left(-\frac{K'' S \int F(t)dt}{CR_0'}\right)\right\} \quad (20)$$

The equation (20) is of the same form as the equation (10) and it is known that the circuit of FIG. 5 is the circuit realizing the equation (7). The way $V'(t)$ changes in the equation (20) appears to be controlled by $R'(t)$ which is regarded as an approximately ideal photoconductive element, and it is only for the few milliseconds at the beginning of the flash that $R'(t)$ does not follow (respond to) the light, and then the value of $V'(t)$ is not so large as to have much influence. The fact that $R'(t)$ does not respond, as is shown in FIG. 10, to the flashlight intensity at the beginning and then responds strongly to it just as it begins to decrease, means that $R'(t)$ has the tendency to bring $y=e^{-x}$ shown by the curve $f$ in FIG. 4 closer to $y=(L)/(1+ax)$ shown by the ideal broken curve $g$. This shows that the preferred embodiment shown in FIG. 5 is all the more effective in the automatic adjustment of the proper exposure.

In the two preferred embodiments described above, the light intensity adjustment stops 4 and 4' are made to correspond to the film sensitivity S, the square of the rotation angle of the distance adjustment is made to correspond to the variable resistance 6, 9, the square of the stop is made to correspond to the variable resistance 7, 10; but it is known that by transforming the equation (7) such a construction is possible in which the light intensity adjustment devices 4, 4' are in inverse proportion to the square of the stop, and the variable resistance 6, 9 in inverse proportion to the square of the distance adjustment and the variable resistance 7, 10 in inverse proportion to the film sensitivity S. The construction may easily be changed so that the variable resistances 6, 9 and 7, 10 are replaced with variable switch resistance value or the adjustment by the light intensity adjustment devices 4, 4' with the variability of the capacity of the condensers 14, 14'.

In the preferred embodiment shown in FIG. 11, the exposure deciding factors are made to correspond with the two filters 3, 3' and the stop 4 which constitute the light intensity control parts for the light impinging on the solar battery 2 which is used as the photoelectric element. The stop 4 changes in proportion to the square of the rotation angle of the distance adjustment ring as it is rotated from the position of infinity, the filter 3 has a filtration rate in proportion to the film sensitivity S, and the filter 3' has a filtration rate which is proportional to the square of the camera lens stop.

FIG. 12 shows the outline exterior view of the camera with the circuit of each preferred embodiment of the present invention. 23 is the flashgun mounted into the accessory shoe (not shown in the Figure) of the camera 24. The flashgun has the reflection shade 20 and the socket 20a into which is fitted the flashbulb 22. In one part of the reflection shade 20 is window 21 in which is mounted the photoelectric element 2 which receives the light from the flashbulb through the filter 3 or 3' and the stop 4 as are shown in FIG. 14. It can also be constructed so that the flashgun is built integrally into the camera.

Further, 25 is a flexible pipe of which one end 25b is fixedly attached onto the flashgun 23 and the other end 25a can be screwed onto the camera. Inside the flexible pipe 25 is slidingly fitted an equally flexible wire 26 whose construction is the same as known flexible wires. One end 26a of the flexible wire 26 is made to press against the L-shaped metal piece 27 inside the camera 24 when the flexible pipe 25 is fitted, by known mechanism, into the camera 24, and the other end 26b is connected with the stop 4 inside the flashgun 23. As is shown in FIG. 13, on one edge of the L-shaped metal piece 27 is formed the rack 27a which is engaged through the idle gear 28, with the teeth 29a of the ring 29, and the ring 29 is connected with and rotates with the distance adjustment ring (not shown in the Figure) by means of the projection 29b. Thus, in accordance with the rotation of the distance adjustment ring the L-shaped metal piece 27 moves up and down guided by the guiding groove 27b and the pin, and the movement is conveyed to the stop 4 through the flexible wire 26. The stop 4 permits the photoelectric element to receive part of the flash beam which is proportional to the square of the rotation angle of the distance adjustment ring.

What is claimed is:

1. A control device for automatically adjusting the exposure time of a camera having a photoflash unit, a focus adjusting device and a stop adjustment mechanism comprising;
    an electric power source,
    delay means for providing a variable output proportional to the direct light emitted from said photoflash unit, said delay means including a photoconductive element responsive to said direct light and connected to said power source, a capacitor connected to said photoconductive element to be charged by the current therethrough,
    means for providing a first signal which varies in accordance with the distance of the subject from the camera, said means including a variable resistance connected to said power source and varied in accordance with the square of the setting of said focus adjusting device,
    means for providing a second signal which varies in accordance with said stop adjustment mechanism, said means including another variable resistance connected to said power source and varied in accordance with the square of the setting of said stop adjustment mechanism,
    means for varying the transmission of light from said photoflash unit to said photoconductive element in accordance with the film sensitivity, said means including a light quantity adjusting device interposed between said photoconductive element and said photoflash unit, and
    means for operating the camera shutter in accordance with said first signal, said second signal and said variable output, said means including a switching circuit having a transistor, the base of said transistor is connected to said capacitor, the emitter of said transistor is connected to said variable resistance and said another variable resistance so that the switching of said transistor is controlled by the variation of said variable and said another variable resistance.

2. A control device for automatically adjusting the exposure time of a camera having a photoflash unit, a focus-adjusting device and a stop adjustment mechanism comprising:
    an electric power source,
    delay means for providing a variable output proportional to the direct light emitted from said photoflash unit, said delay means including a photoconductive element responsive to said direct light and connected to said power source, a capacitor connected to said photoconductive element to be charged by the current therethrough,
    means for providing a first signal which varies in accordance with the distance of the subject from the camera, said means including a variable resistance connected to said power source and varied in accordance with the square of the setting of said focus adjusting device,
    means for providing a second signal which varies in accordance with the square of the film sensitivity, said means including another variable resistance varied in accordance with the square of the film sensitivity,
    means for varying the transmission of light from said photoflash unit to said photoconductive element in accordance with the square of the setting of said stop adjustment mechanism, said means including a light quantity adjusting device interposed between said photoconductive element and said photoflash unit, and
    means for operating the camera shutter in accordance with said first signal, said second signal and said variable output, said means including a switching circuit having a transistor, the base of said transistor is connected to said capacitor, the emitter of said transistor is connected to said variable resistance and said another variable resistance so that the switching of said transistor is controlled by the variation of said variable and said another variable resistance.

* * * * *